United States Patent [19]

Brückner

[11] Patent Number: 5,539,740
[45] Date of Patent: Jul. 23, 1996

[54] METHOD FOR FORWARDING A MESSAGE CELL STREAM VIA A PLURALITY OF PARALLEL TRUNKS WHILE ADHERING TO THE SEQUENCE OF THE MESSAGE CELLS

[75] Inventor: Roland Brückner, Weissenhorn, Germany

[73] Assignee: Siemens Aktiengesellschaft, Munich, Germany

[21] Appl. No.: 374,736

[22] PCT Filed: Jul. 7, 1993

[86] PCT No.: PCT/EP93/01768

§ 371 Date: Jan. 18, 1995

§ 102(e) Date: Jan. 18, 1995

[87] PCT Pub. No.: WO94/03005

PCT Pub. Date: Feb. 3, 1994

[30] Foreign Application Priority Data

Jul. 20, 1992 [EP] European Pat. Off. ............... 92112345

[51] Int. Cl.$^6$ .................. H04J 3/06; H04J 3/26; H04L 12/56; H04L 25/14
[52] U.S. Cl. .................. 370/60.1; 370/84; 370/94.2; 370/108; 370/112; 375/260
[58] Field of Search .................. 370/60.1, 84, 85.8, 370/94.2, 95.2, 108, 112; 375/260; 455/59

[56] References Cited

U.S. PATENT DOCUMENTS

| | | | |
|---|---|---|---|
| 3,708,783 | 1/1973 | Hedin | 371/30 |
| 4,775,987 | 10/1988 | Miller | 370/108 |
| 4,829,227 | 5/1989 | Turner | 370/84 |
| 4,870,641 | 9/1989 | Pattavina | 370/60 |
| 5,065,396 | 11/1991 | Castellano et al. | 370/84 |
| 5,251,210 | 10/1993 | Mann et al. | 370/84 |
| 5,293,378 | 3/1994 | Shimizu | 370/112 |

FOREIGN PATENT DOCUMENTS

| | | |
|---|---|---|
| 0213641 | 11/1987 | European Pat. Off. . |
| 55-104159 | 9/1980 | Japan . |

OTHER PUBLICATIONS

Electronics and Communications in Japan, Part 1, vol. 68, No. 9, 1985, "Analysis on a Multilink Packet Transmission System with Random Allocation", Toshihiro Nishizono et al., pp. 98–104.

IEEE International Conference on Communication ICC 1990, "A 3-Stage Interconnection Structure for Very Large Packet Switches", Soung C. Liew et al, pp. 771–777.

IEEE Journal on Selected Areas in Communications, vol. 9, No. 8, Oct. 1991, "A Scalable ATM Switching System Architecture", Wolfgang Fischer, et al, pp. 1299–1307.

Primary Examiner—Hassan Kizou
Attorney, Agent, or Firm—Hill, Steadman & Simpson

[57] ABSTRACT

A message cell stream that carries message cells transmitted according to an asynchronous transfer method during the course of virtual connections is forwarded via a plurality of parallel trunks. Successive message cells are thereby cyclically distributed onto the trunks with a fixed temporal offset. Upon reception of the message cells, the trunks are cyclically interrogated in the same run sense with a temporal offset that is shorter than the temporal offset with which successive message cells are distributed onto the trunks.

9 Claims, 6 Drawing Sheets

PRIOR ART

FIG 4

PRIOR ART

METHOD FOR FORWARDING A MESSAGE CELL STREAM VIA A PLURALITY OF PARALLEL TRUNKS WHILE ADHERING TO THE SEQUENCE OF THE MESSAGE CELLS

BACKGROUND OF THE INVENTION

The invention is directed to a method for forwarding a message cell stream via a plurality of parallel trunks, whereby the message cell stream carries fixed-length message cells in the course of an asynchronous transfer method, the transport rate of the message cell stream is higher than the transport rate of an individual trunk, successive message cells of the message cell stream are cyclically distributed onto the plurality of trunks and forwarded.

Conditioned by technology, the transmission bit rate on the individual, physical transmission links of a transmission system is limited by the processing speed of the transmission elements such as, for example, trunks or switching elements that are employed. When a message cell stream whose transport bit rate exceeds the transmission bit rate of an individual, physical transmission link is to be transmitted, then it can be transmitted via a plurality of parallel, physical transmission links.

IEEE International Conference on Communications ICC '90, Conference Record, 16–19 April 1990, Atlanta, U.S.A., vol. 2, pp. 771–777 discloses a transmission system wherein a stream of packets carrying useful data is forwarded via a group of parallel trunks. Successive message cells are thereby cyclically distributed onto the group of trunks and are forwarded during the same time slot. Due to different lengths, different temperature or different line lengths of the trunks in the groups of trunks or due to fluctuations in the clock frequencies given plesiochronic switching systems, non-directional deviations in running time of the packets can occur. Due to the deviations in running time, errors in the sequence of the packets can occur upon reception of the packets, as shall be set forth in greater detail later.

SUMMARY OF THE INVENTION

The invention is based on the problem of specifying a method that allows a forwarding of message cells of a message cell stream via a plurality of parallel trunks while assuring the sequence of the message cells—even given the occurrence of non-directional deviations in running time on the individual trunks.

In the method initially cited, the problem is resolved in that the successive message cells are temporally offset relative to one another;

the trunks are cyclically interrogated in the same sense upon reception of the message cells, whereby, given the cyclical interrogation of successive trunks, a) the offset is shorter than the offset with which successive message cells are forwarded, and b) the chronological spacing of the beginning of two successive interrogation cycles is shorter than the duration of the forwarding of a message cell.

Based on the criterion of the need for transmission capacity for a message cell stream, the method of the invention enables a flexible offerability of a plurality of trunks, whereby the sequence of the message cells of the message cell stream is strictly observed at the transfer to a following transmission equipment. The beginning of an interrogation cycle is thereby uncorrelated with the transmission time slots on the trunks.

A development of the method of the invention provides that an arrival character is set at the arrival of a message cell from a trunk in a reception means, and the arrival character that has been set is reset when the trunk is interrogated. What this measure assures is that every message cell is transferred only once into a reception equipment.

A further development of the method of the invention provides that the designations of message cells that are to be forwarded onto a bundle of successive trunks are entered into the queue belonging to the trunk whose designation derives by masking the least significant binary character of the binarily presented queue designation. This measure provides an especially simple selection of a queue for bundle sizes whose plurality of trunks can be presented by a whole exponent of the mantissa 2.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 2:
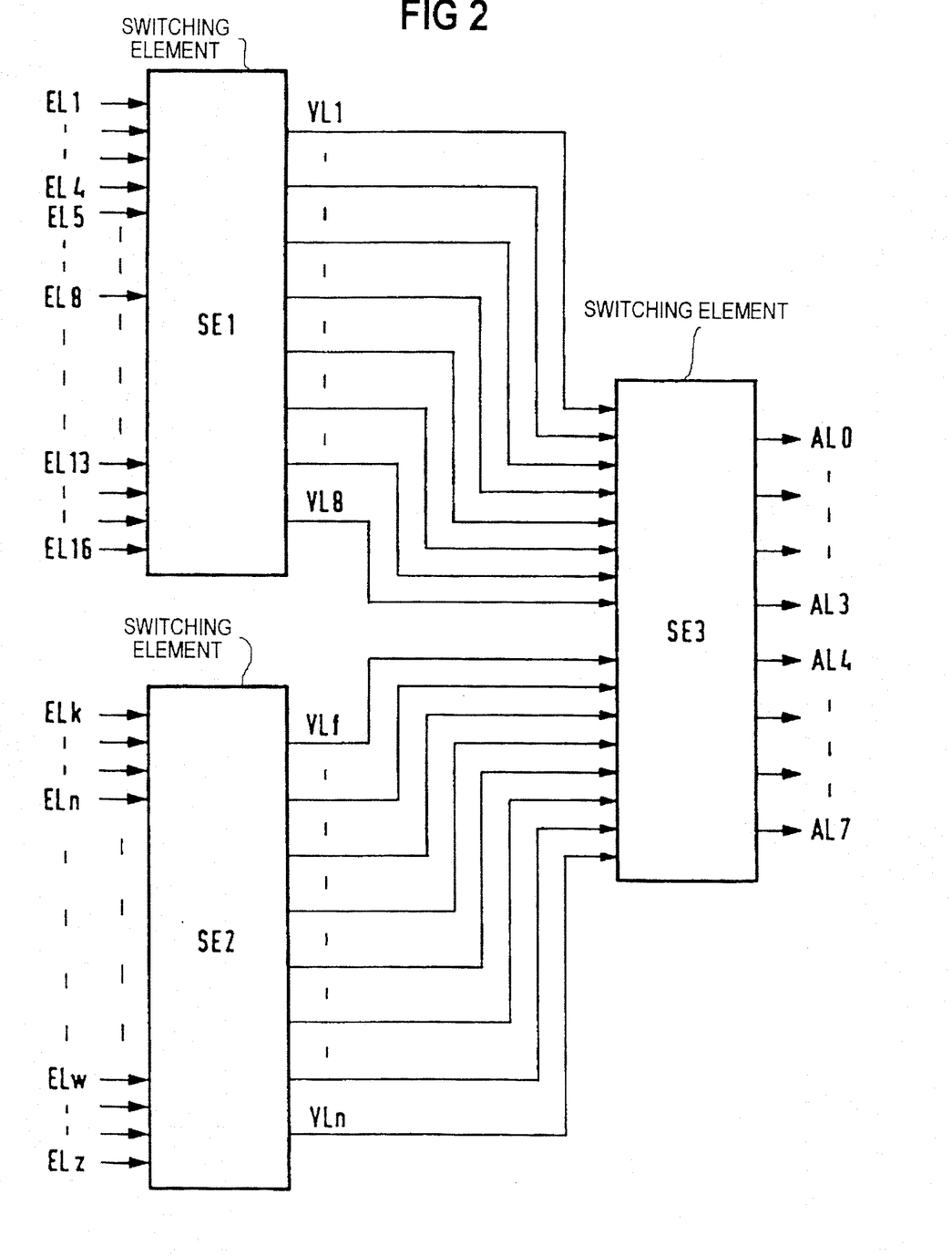
FIG. 2 a schematic illustration of the interconnection of three switching elements at which the method of the invention can be applied.

FIG. 2 shows 3 switching elements SE1, SE2, SE3 each having respectively 16 inputs and eight outputs. The structure and functioning of such switching elements are known in and of themselves, for example from IEEE Journal on Selected Areas in Communications, vol. 9, no. 8, Oct. 1991, and therefore need not be set forth in greater detail here. The outputs of the switching element SE1 and of the switching element SE2 are connected to the inputs of the switching element SE3 via trunks VL1 . . . VL8 or, respectively, VLf . . . VLn. The inputs of the switching element SE1 and of the switching element SE2 are connected to input lines EL1 . . . EL4 . . . EL5 . . . EL8 . . . EL13 . . . EL16 or, respectively, ELk . . . ELn . . . ELw . . . ELz. Let the input lines in turn be connected to the outputs of switching elements that are not shown in greater detail or to other equipment suitable for the forwarding of message cells that can be remotely arranged. The output lines AL0 . . . AL7 connected to the outputs of the switching element SE3 can in turn be connected to following switching elements or can lead to remote equipment for forwarding message cells. Below, the input lines EL and the output lines AL can be generally considered as trunks VL. A respective transmission of message cells on the trunks ensues with a constant message cell rate according to an asynchronous transfer mode during the course of virtual connections. Let the message cells thereby be a matter of cells having a fixed length, each of which has a cell header with, for example, a length of five octets as well as a useful data part having a length, for example, of 48 octets. The transmission of the actual message signals ensues in the useful data part. What are thereby to be understood by message signals are message and text signals as well as voice or, respectively, image signals in digital form. Among other things, a message cell header comprises what is referred to as a virtual channel number with which the virtual connection coming into consideration on the respective trunk is referenced. During transmission pauses, moreover, dummy cells corresponding to the message cells are transmitted.

A message cell stream whose transmission bit rate of, for example, 600 Mbit/s exceeds the transport bit rate of a trunk having, for example, 150 Mbit/s is transmitted via a plurality of four trunks in the example.

Figure 1:
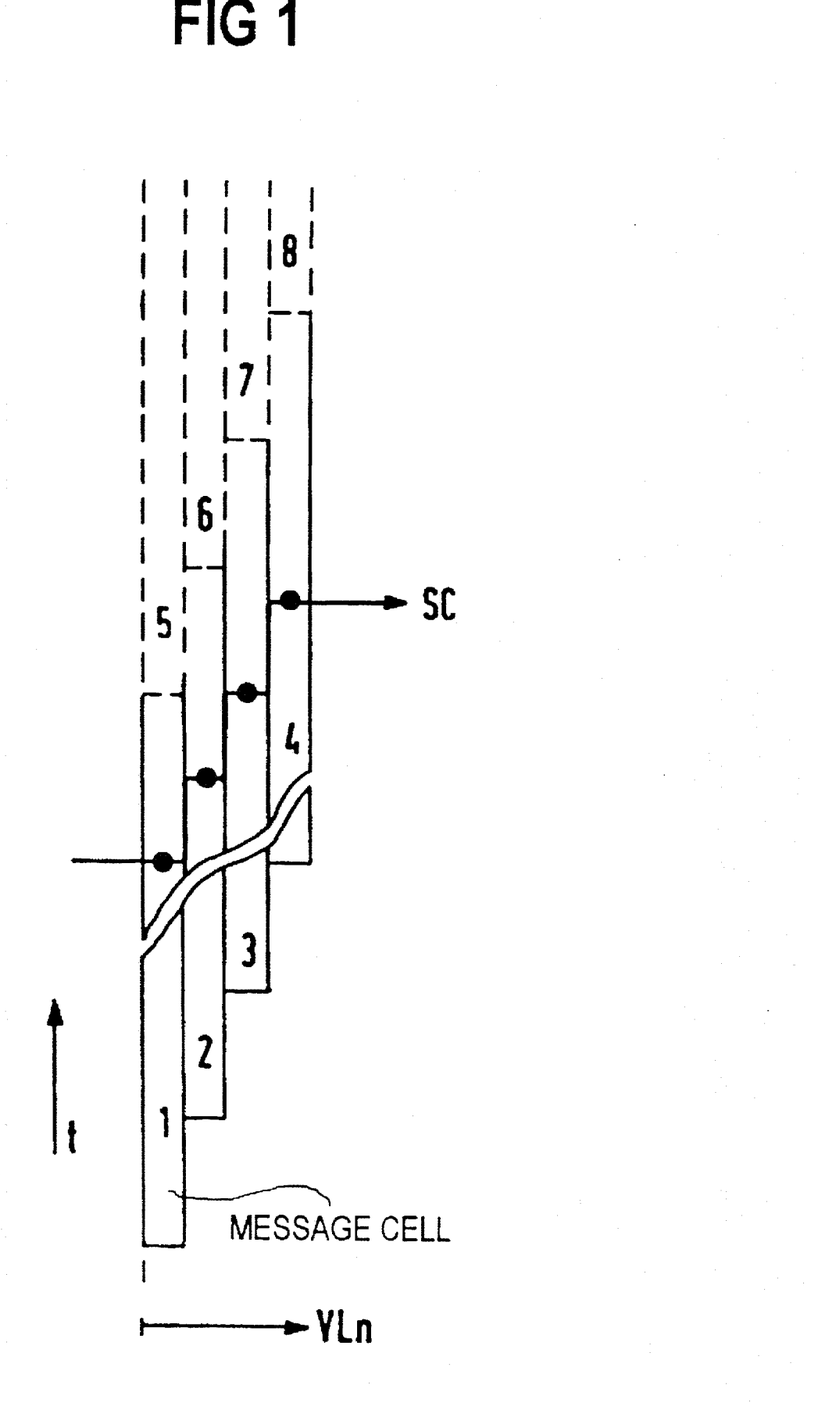
FIG. 1 an illustration of the inventive forwarding of successive message cells of a message cell stream via a bundle of four trunks.

According to one feature of the invention, successive message cells of a message cell stream are cyclically distributed onto a plurality of trunks, whereby the message cells are accompanied with a fixed, temporal offset respectively compared to the immediately preceding message cell. FIG. 1 shows a temporal illustration of the forwarding of successive, continuously numbered message cells of a message cell stream via a plurality of four trunks VLn. Within a cyclical distribution of message cells onto the trunks, the message cells comprise a constant temporal offset compared to a respectively preceding message cell that, for example, may be assumed to amount to the transmission duration of three octets. Let the trunks from FIG. 1 be established by the input lines EL1 . . . ELA, whereby the message cells referenced with the continuous numbers 1 and 5 are transmitted on the input line EL1 and the message cells referenced with the continuous numbers 2, 3, 4, 6, 7, 8 are analogously transmitted on the input lines EL2 . . . EL4. Let the inputs of a switching element SE be respectively connected to an input line. An arrival character (arrival flag) is set for every input given the arrival of a message cell. The inputs of a switching element are cyclically interrogated for the presence of set arrival flags. The cyclical interrogation of the inputs ensues in the same run sense with which the message cells are distributed onto the trunks. Given a predetermined run direction of the cyclical interrogation of the inputs, the line location of the input lines has been determined. It is provided according to a feature of the invention that the temporal offset with which successive inputs are interrogated for set arrival flags is shorter than the offset with which the successive message cells are forwarded. The temporal offset with which successive inputs are interrogated amounts, for example, to the transmission duration of two octets. FIG. 1 shows an interrogation referenced SC of inputs to which the message cell stream is supplied. The black dots indicate that a set arrival flag was recognized. Further, a respectively recognized arrival flag is reset. Given the interrogation cycle shown in FIG. 1, the message cells having the continuous sequence numbers 1, 2, 3, 4 are detected in the correct sequence. Moreover, let it be pointed out that the beginning of the cyclical interrogation is not correlated with the arrival of the message cells. The feature of the invention in accord wherewith the temporal spacing of the beginning of two successive interrogation cycles is shorter than the duration for forwarding a message cell is also related thereto.

Figure 3:
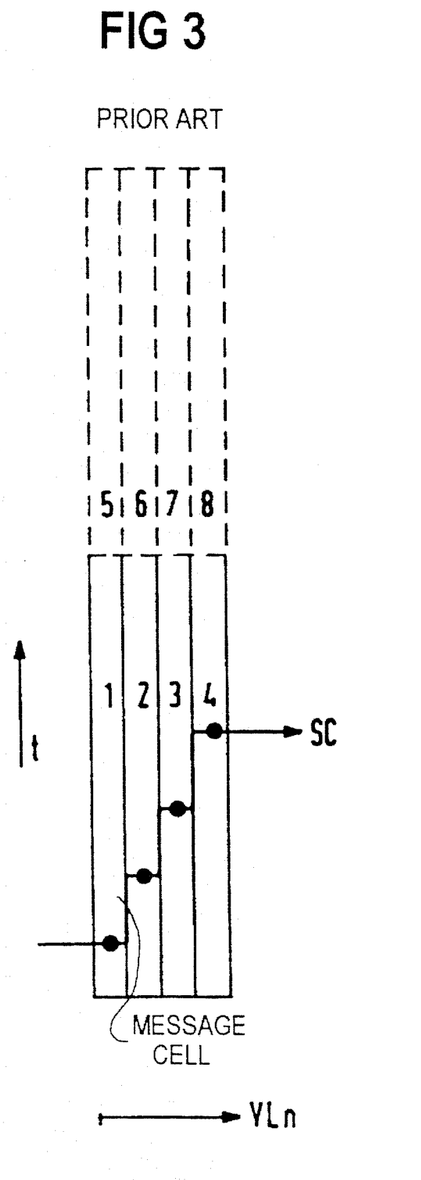
FIG. 3 an isochronic (synchronous) forwarding of successive message cells of a message cell stream via a bundle of four trunks in conformity with the prior art.
Figure 4:
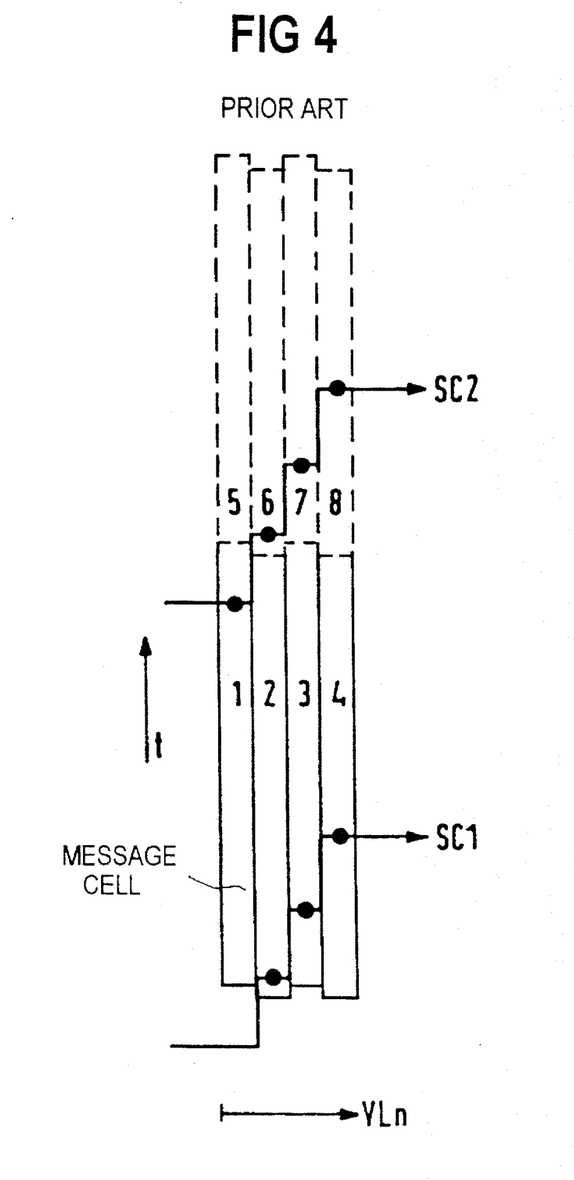
FIG. 4 the occurrence of a possible error of the prior art in the sequence of the message cells in the interrogation of the trunks.

FIG. 3 shows the forwarding of consecutively numbered message cells of a message cell stream via a plurality of four trunks according to the prior art, whereby message cells are isochronically (synchronously) transmitted onto the trunks. As shown by black dots, the sequence of the message cells is correctly detected in the interrogation SC of the trunks. Given the forwarding of message cells according to the prior art shown in FIG. 4, let an arbitrary shift of the arrival times of the message cells on the individual trunks occur due, for example, to temperature differences on the individual trunks or due to different lengths of the individual trunks. An error in the sequence of the recognized message cells occurs given the time slot of two successive interrogations SC1, SC2 shown in FIG. 4 with respect to the arrival times of message cells on the individual trunks. During the first interrogation SC1, namely, the message cells having the consecutive sequence numbers 2, 3, 4 are recognized and the message cells having the consecutive sequence numbers 1, 6, 7, 8 are recognized during the second interrogation SC2.

Figure 5:
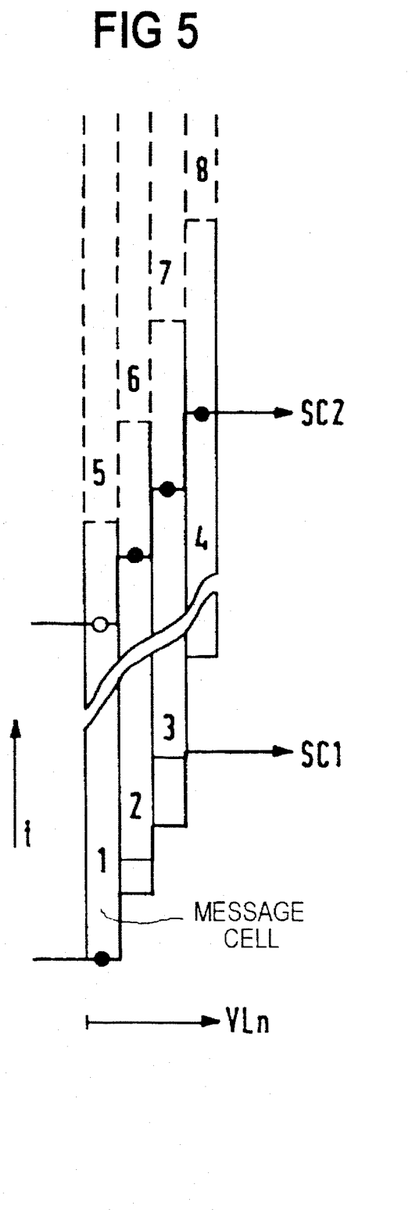
FIG. 5 and FIG. 6 the inventive interrogation of a bundle of trunks having a beginning of the interrogation respectively modified compared to FIG. 1 with reference to the arrival time of the first message cell of the message cell stream.

FIG. 5 shows two successive interrogations SC1 and SC2 according to the method of the invention, whereby the beginning of the first interrogation SC1 coincides with the point in time of the arrival of the message cell having the consecutive sequence number 1. The message cell having the consecutive sequence number 1 is thereby recognized during the first interrogation. The message cell having the consecutive sequence number 1, on the one hand, is no longer recognized during the second interrogation SC2, as indicated by a white dot, since its arrival flag was already reset during the first interrogation SC1, and, on the other hand, the message cells having the consecutive sequence numbers 2, 3, 4 are recognized, the sequence of the message cells having thus been adhered to. As may be seen, the message cells are recognized in the correct sequence of their consecutive sequence numbers in this case as well.

Figure 6:
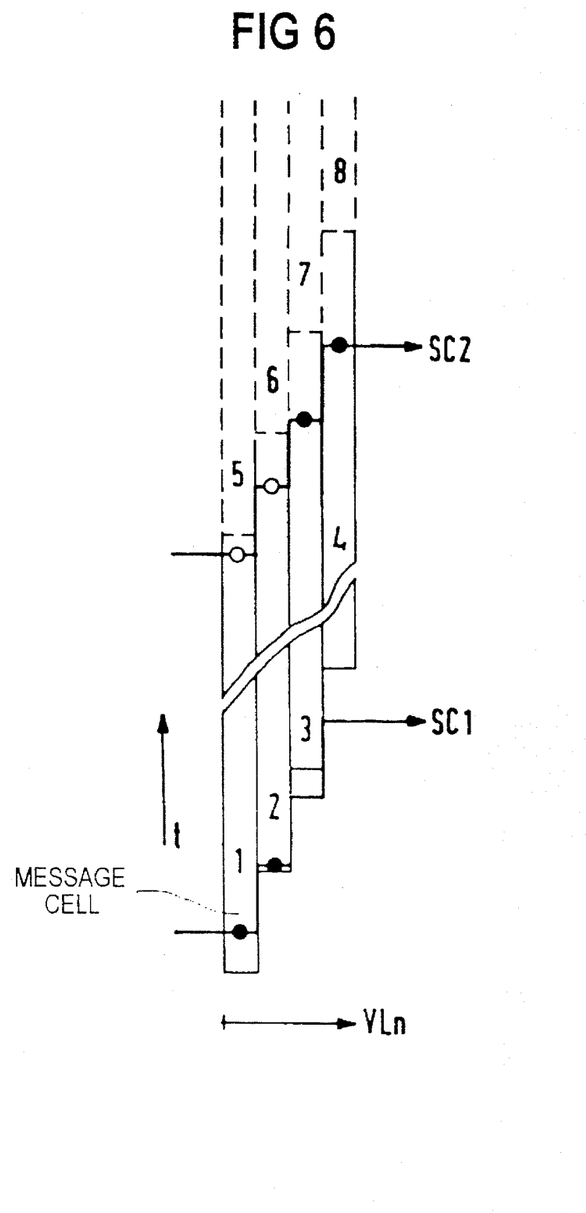

FIG. 6 shows two successive interrogations SC1 and SC2 according to the inventive method, whereby the beginning of the first interrogation SC 1 ensues later by the transmission duration of a few octets than the point in time of the arrival of the message cell having the consecutive sequence number 1. During the first interrogation SC1, the message cells having the consecutive sequence numbers 1 and 2 are recognized, and the message cells having the consecutive sequence numbers 3 and 4 are recognized during the second interrogation SC2. As may be seen, the message cells are recognized in the correct sequence of their consecutive sequence numbers.

Figure 7:
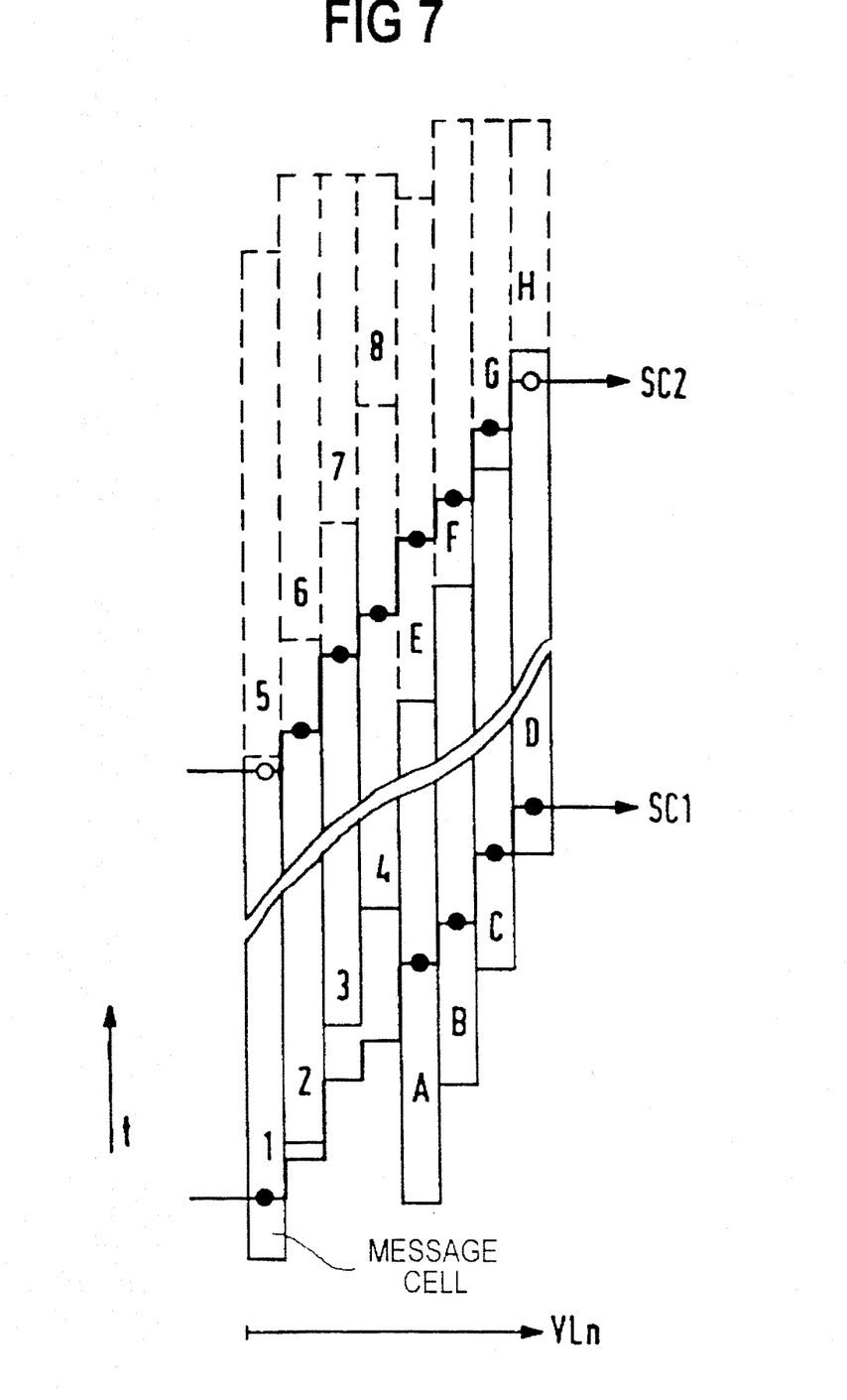
FIG. 7 the inventive interrogation of two message cell streams supplied to neighboring inputs of a switching element on respectively four trunks.

FIG. 7 shows a message cell stream referenced with consecutive sequence numbers and a message cell stream referenced with upper case letters in an alphabetic sequence that are respectively transmitted on four trunks. Let these two message cell streams comprise a temporal offset relative to one another with respect to the arrival of the message cell having the consecutive sequence number 1 and be supplied to successively interrogated inputs of a switching element. Let the message cell stream having the message cells referenced with consecutive sequence numbers be supplied to the switching element SE1 from FIG. 2 on the input lines EL1 . . . EL4 and let the message stream having the message cells referenced with uppercase letters be supplied to this switching element on the input lines EL5 . . . EL8. As identified by black dots, the message cells having the designation 1, A, B, C, D are recognized during the first interrogation SC1. The message cells having the designation 2, 3, 4, E, F, G are recognized during the second interrogation. As may be seen, the message cells of each message cell stream are recognized in the correct sequence. The recognization of successive message cells of a message cell stream during different interrogations is insignificant for an asynchronous transfer mode. It may also be seen in the exemplary embodiment of FIG. 7 that the temporal offset in the interrogation amounts to the chronological duration for the transmission of one octet in the one instance and to the chronological duration for the transmission of two octets in another instance in continuous alternation. This alternation in the offset is based thereon that one output is serviced after the interrogation of two inputs given a switching element that comprises a plurality of inputs that is twice as great as the plurality of outputs, as, for example, in FIG. 2. The temporal offset in the interrogation of the trunks according to FIG. 7 is thereby always smaller than the offset with which successive message cells are forwarded.

The outputs of a switching element are each respectively connected to a trunk leading in a predetermined direction. A queue organized as FIFO is allocated to every output of a switching element. The designations of message cells destined for forwarding of the appertaining trunk are entered into a respective queue in the sequence of their recognition during the interrogation of the inputs. A plurality of trunks leading in one direction forms a directional bundle. The designations of message cells provided for forwarding on a direction bundle are entered in only one queue. The designation of a queue allocated to a directional bundle can ensue by masking the least significant bits (LSB) of the binarily coded designation of the queues. What is thereby to be understood by masking is that a binary character is set to the value zero regardless of its actual status. When, for example, the output lines AL0 . . . AL3 and the output lines AL4 . . . AL7 thus each respectively form a directional bundle, then the queue having the designation $000_2=000_{10}$ is allocated to the directional bundle formed with the output lines AL0 . . . AL3 and the queue having the designation $100_2=4_{10}$ is allocated to the directional bundle formed with the output lines AL4 . . . AL7. For forwarding, the message cells are placed onto the appertaining output line in the sequence of their designations in the queue. When the message cells are to be forwarded onto a directional bundle, the message cells are cyclically output onto the output lines of the directional bundle in the sequence of their designations in the appertaining queue.

Figures 8, 9:
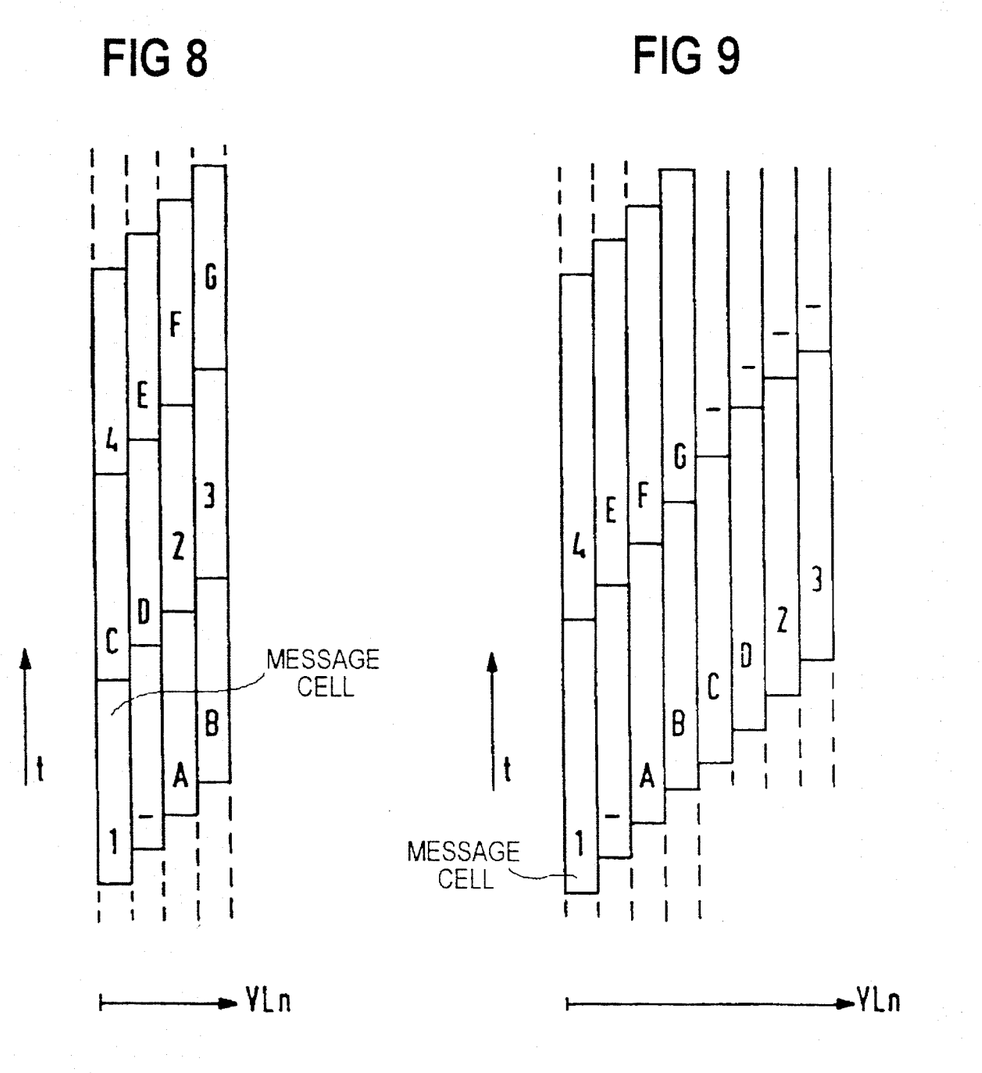
FIG. 8 the sequentially correct forwarding of message cells received according to FIG. 7 onto a bundle of four trunks.
FIG. 9 the sequentially correct forwarding of message cells received according to FIG. 7 onto a bundle of eight trunks.

FIG. 8 shows the forwarding of message cells received according to FIG. 7 onto a directional bundle having four trunks, whereby the transport rate on each of the four trunks in FIG. 8 is twice as high as that on one of the trunks in FIG. 7.

FIG. 9 shows the forwarding of the message cells received according to FIG. 7 onto a directional bundle having eight trunks, whereby the trunks in FIG. 7 and in FIG. 9 each comprise the respectively same transport rate.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for forwarding a message cell stream via a plurality of parallel trunks, the message cell stream carrying fixed-length message cells during an asynchronous transfer mode, a transport rate of the message cell stream being higher than a transport rate of an individual trunk of the plurality of parallel trunks, successive message cells of the message cell stream being cyclically distributed onto the plurality of trunks and being forwarded, comprising the steps of:

temporally offsetting the successive message cells relative to one another;

cyclically distributing the successive message cells onto trunks of the plurality of parallel trunks in a predetermined manner;

cyclically interrogating the trunks of the plurality of parallel trunks in said predetermined manner upon reception of the message cells, interrogation of the trunks also being offset, whereby, given the cyclical interrogation of successive trunks of the plurality of parallel trunks, a) the offset of the interrogation is shorter than an offset with which successive message cells are forwarded, and b) chronological spacing of beginning of two successive interrogation cycles is shorter than a period of time of the forwarding of a message cell.

2. The method according to claim 1, wherein the successive message cells are forwarded with a temporal offset having a fixed chronological duration.

3. The method according to claim 1, wherein the temporal offset with which successive message cells are forwarded amounts to a fraction of a period of time of the forwarding of a message cell.

4. The method according to claim 3, wherein the fraction is equal to a fractional portion which is equal to a ration of one trunk to a total number of trunks of the plurality of parallel trunks.

5. The method according to claim 3, wherein the fraction is smaller than a fractional portion, which is equal to a ration of one trunk to a total number of trunks of the plurality of parallel trunks.

6. The method according to claim 1, wherein trunks of the plurality of parallel trunks are coupled to a switching element having a central memory and wherein, upon reception of message cells in the switching element, the trunks are interrogated with a temporal offset that is equal to the temporal spacing with which message cells from successively interrogated trunks are written into the central memory in the switching element.

7. The method according to claim 1, wherein upon arrival of a message cell in a reception equipment from a trunk, an arrival flag is set and wherein the arrival flag that was set is reset when the trunk is interrogated.

8. The method according to claim 1, wherein trunks of the plurality of parallel trunks are coupled to a switching element, and wherein, for forwarding message cells from the switching element onto a bundle of trunks, designations of these message cells are entered in a queue associated with the bundle, and these message cells are cyclically forwarded onto the trunks of said bundle based on a criterion of a sequence of the designations in the queue.

9. The method according to claim 8, the designations of message cells that are to be forwarded onto a bundle of successive trunks are entered into a queue belonging to the bundle of successive trunks, a designation of the bundle of successive trunks being provided without taking into consideration the least significant binary character of the binarily coded queue designation.

* * * * *